United States Patent
Tokura et al.

(10) Patent No.: US 11,287,032 B2
(45) Date of Patent: Mar. 29, 2022

(54) GEAR STAGE CHOOSING APPARATUS, GEAR STAGE CHOOSING METHOD, AND SIMULATION APPARATUS

(71) Applicant: TOYOTA JIDOSHA KABUSHIKI KAISHA, Toyota (JP)

(72) Inventors: Takaaki Tokura, Nagoya (JP); Katsumi Kono, Toyota (JP); Takeshi Yasuda, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/986,346

(22) Filed: Aug. 6, 2020

(65) Prior Publication Data
US 2021/0148457 A1 May 20, 2021

(30) Foreign Application Priority Data
Nov. 14, 2019 (JP) .............................. JP2019-206386

(51) Int. Cl.
*F16H 61/02* (2006.01)
*F16H 59/22* (2006.01)
(Continued)

(52) U.S. Cl.
CPC ......... *F16H 61/0213* (2013.01); *F16H 59/22* (2013.01); *F16H 59/44* (2013.01);
(Continued)

(58) Field of Classification Search
CPC ......... F16H 61/0213; F16H 2061/0015; F16H 2061/0071; F16H 2061/022; F16H 59/22; F16H 59/44; F16H 59/54
See application file for complete search history.

(56) References Cited

U.S. PATENT DOCUMENTS

2009/0228180 A1 9/2009 Yamada
2010/0082228 A1* 4/2010 Lee ..................... B60R 16/0236
                                                        701/123
(Continued)

FOREIGN PATENT DOCUMENTS

JP 2009-216124 A 9/2009
JP 2012041982 A * 3/2012 ............. F16H 61/02

OTHER PUBLICATIONS

Machine translation of JP2012041982A filed Oct. 8, 2021 (Year: 2021).*

(Continued)

*Primary Examiner* — Tisha D Lewis
(74) *Attorney, Agent, or Firm* — Oliff PLC

(57) ABSTRACT

A gear stage choosing apparatus that chooses a gear stage of a stepped transmission of a vehicle includes a storage unit configured to store a shift map containing a relationship between vehicle speed and gear stage, a determination unit configured to determine a gear stage associated with an estimated vehicle speed after a lapse of a first period of time from current time based on the shift map, an evaluation unit configured to evaluate fuel efficiency in some gear stages, including the determined gear stage and one or more gear stages higher or lower in less than or equal to a specific number of gear steps than the determined gear stage, of multiple gear stages, and a choosing unit configured to choose a gear stage selected from among the some gear stages based on the fuel efficiency as a gear stage to which a current gear stage is changed.

7 Claims, 4 Drawing Sheets

(51) Int. Cl.
*F16H 59/54* (2006.01)
*F16H 59/44* (2006.01)
*F16H 61/00* (2006.01)

(52) U.S. Cl.
CPC ..... *F16H 59/54* (2013.01); *F16H 2061/0015* (2013.01); *F16H 2061/0071* (2013.01); *F16H 2061/022* (2013.01)

(56) References Cited

U.S. PATENT DOCUMENTS

| | | | | |
|---|---|---|---|---|
| 2013/0151074 A1* | 6/2013 | Takeuchi | ............. | B60W 50/06 |
| | | | | 701/37 |
| 2020/0238980 A1* | 7/2020 | Goto | ................... | G05D 1/0214 |
| 2021/0080001 A1* | 3/2021 | Sato | ................... | B60W 10/103 |

OTHER PUBLICATIONS

Yu et al.; "Performance of an Eco-Driving Nonlinear MPC System for a Power-Split HEV during Car Following;" SICE Journal of Control, Measurement, and System Integration; Jan. 2014; vol. 7, No. 1; pp. 55-62.

* cited by examiner

GEAR STAGE CHOOSING APPARATUS, GEAR STAGE CHOOSING METHOD, AND SIMULATION APPARATUS

CROSS-REFERENCE TO RELATED APPLICATION

This application claims priority to Japanese Patent Application No. 2019-206386 filed on Nov. 14, 2019, incorporated herein by reference in its entirety.

BACKGROUND

1. Technical Field

The disclosure relates to a gear stage choosing apparatus for a stepped transmission included in a vehicle, a gear stage choosing method, and a simulation apparatus.

2. Description of Related Art

In vehicles including a stepped transmission, the gear stage of the stepped transmission is automatically chosen. A gear stage is typically chosen based on a shift map that defines in advance the relationship between vehicle speed and gear stage. A shift map is defined such that, for example, fuel efficiency is optimal at an assumed standard running load.

Kaijiang Y U, Masakazu MUKAI, and Taketoshi KAWABE, "Performance of an Eco-Driving Nonlinear MPC System for a Power-Split HEV during Car Following", SICE Journal of Control, Measurement, and System Integration, January 2014, Vol. 7, No. 1, pp. 055-062 describes a technique for choosing the gear stage (speed ratio) of a stepped transmission a few seconds ahead by using a method called model predictive control (MPC). With this technique, a gear stage where fuel efficiency is predicted to be optimal is chosen from among all the gear stages based on the performance and statuses of an engine, a motor, a generator, and a battery, and a running load.

SUMMARY

The running load of a vehicle fluctuates depending on the gradient of a road surface, the condition of the road surface, the pay load of the vehicle, and the like. Therefore, a gear stage chosen as defined by the shift map does not always actually provide optimal fuel efficiency.

With the technique described in Kaijiang Y U, Masakazu MUKAI, and Taketoshi KAWABE, "Performance of an Eco-Driving Nonlinear MPC System for a Power-Split HEV during Car Following", SICE Journal of Control, Measurement, and System Integration, January 2014, Vol. 7, No. 1, pp. 055-062, fuel efficiency is calculated in consideration of such fluctuating factors; however, all the gear stages are calculated based on a complicated model, so it is not realistic to apply the technique to real-time control because a large amount of calculation.

Therefore, a gear stage choosing apparatus that is capable of choosing a gear stage where fuel efficiency is good in a stepped transmission with a realistic amount of calculation is desired. In addition, a simulation apparatus that is capable of providing a good simulation pattern is desired to, for example, test and evaluate such a gear stage choosing apparatus.

The present disclosure provides a gear stage choosing apparatus that is capable of choosing a gear stage where fuel efficiency is good in a stepped transmission with a realistic amount of calculation, a gear stage choosing method, and a simulation apparatus therefor.

An aspect of the disclosure relates to a gear stage choosing apparatus that chooses a gear stage of a stepped transmission included in a vehicle. The gear stage choosing apparatus includes a storage unit configured to store a shift map containing a relationship between vehicle speed and gear stage, a determination unit configured to determine a gear stage associated with an estimated vehicle speed after a lapse of a first period of time from current time based on the shift map, an evaluation unit configured to evaluate fuel efficiency in some gear stages of multiple gear stages, the some gear stages including the determined gear stage and one or more gear stages higher or lower in less than or equal to a specific number of gear steps than the determined gear stage, and a choosing unit configured to choose a gear stage selected from among the some gear stages based on the fuel efficiency as a gear stage to which a current gear stage is changed.

Another aspect of the disclosure relates to a simulation apparatus that generates a gradient pattern of a running road of a vehicle and a vehicle speed pattern for simulation. The simulation apparatus includes a gradient pattern generation unit configured to generate a gradient pattern of a running road by, in each of sections into which the running road is divided by a first distance, where a gradient obtained by increasing or reducing a gradient of the section by a first gradient at an equal probability, sequentially deriving a gradient for each section, and a vehicle speed pattern generation unit configured to generate a vehicle speed pattern by, in a model including a lead vehicle that runs in accordance with a first vehicle speed pattern, a rearmost vehicle that runs in accordance with a first preceding vehicle following algorithm, and one or more intermediate vehicles that increase or reduce by one for each first period at an equal probability between the lead vehicle and the rearmost vehicle and that runs in accordance with the first preceding vehicle following algorithm, deriving a vehicle speed of the rearmost vehicle.

According to the aspects of the disclosure, a gear stage where fuel efficiency is good in the stepped transmission is chosen based on the evaluated fuel efficiency of each of some gear stages, so it is possible to provide a gear stage choosing apparatus that is capable of choosing a gear stage with a realistic amount of calculation. It is also possible to provide a simulation apparatus that is capable of generating good simulation patterns of a gradient pattern and a vehicle speed pattern that are applicable to tests and evaluations for a gear stage choosing apparatus.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment of the disclosure will be described. A gear stage choosing apparatus according to the present embodiment determines a gear stage based on an estimated vehicle speed and a shift map and chooses a gear stage where fuel efficiency resulting from consideration of an estimated running load is optimal from among a reasonable range of gear stages including the determined gear stage and one or more gear stages higher or lower than the determined gear stage as a target gear stage (a gear stage to which a current gear stage is changed). With this configuration, in comparison with the case where a gear stage determined based on a shift map is directly chosen as a target gear stage, fuel efficiency is improved. In addition, the gear stage choosing apparatus uses some gear stages of multiple gear stages of the stepped transmission to evaluate fuel efficiency. Therefore, in comparison with the case where all the gear stages are used to evaluate fuel efficiency, the amount of calculation is reduced, and the gear stage choosing apparatus is suitably applied to real-time control.

Configuration

Figure 1:
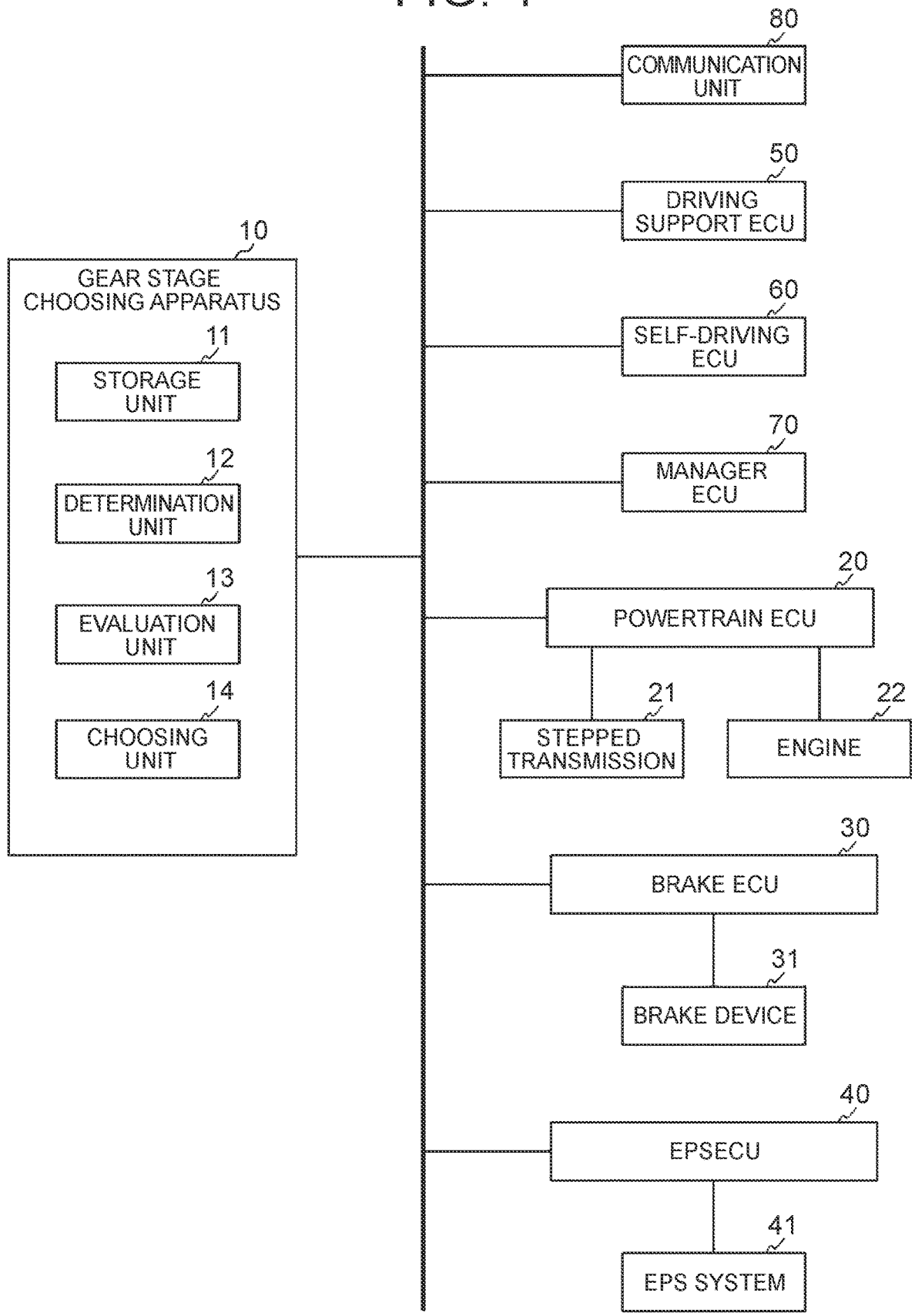
FIG. 1 is a functional block diagram of a gear stage choosing apparatus and its peripheral components according to a first embodiment of the disclosure.

FIG. 1 shows the functional blocks of a gear stage choosing apparatus 10 and its peripheral components according to the present embodiment. A vehicle includes, for example, the gear stage choosing apparatus 10, a powertrain ECU 20, a stepped transmission 21, an engine 22, a brake ECU 30, a brake device 31, an EPSECU 40, an electric power steering (EPS) system 41, a driving support ECU 50, a self-driving ECU 60, a manager ECU 70, a communication unit 80, and the like.

The vehicle may further include various types of devices such as a navigation system and various sensors, such as an accelerator pedal sensor, a brake pedal sensor, a steering angle sensor, a camera, an obstacle sensor that uses light or electromagnetic waves, a vehicle speed sensor, a yaw rate sensor, and a GPS sensor. These are not shown in the drawing.

The driving support ECU 50 is an electronic control unit (ECU) that, for the functions of collision avoidance, preceding vehicle following, lane keeping, and the like, executes driving support control to execute part of control for the motion of the vehicle independently of a user's driving operation. Multiple driving support ECUs 50 may be provided according to functions.

The self-driving ECU 60 is an ECU that executes driving support control to execute all the control for the motion of the vehicle independently of a user's driving operation. The driving support ECU 50 and the self-driving ECU 60 each are a driving controller that outputs an instruction to control the motion of the vehicle, such as an acceleration or deceleration and a steering angle, based on information acquired from various sensors, and the like.

The manager ECU 70 is an ECU that outputs an instruction to the powertrain ECU 20, the brake ECU 30, the EPSECU 40, or the like (hereinafter, these are collectively referred to as actuator ECU) (described later) based on an instruction from the driving support ECU 50, the self-driving ECU 60, or the like.

The manager ECU 70 is an ECU that, when the ECU receives an instruction from the multiple driving support ECUs 50 or the like, performs a process called coordination based on a predetermined rule to choose an instruction to control the vehicle and that provides an instruction to the actuator ECU based on the coordination result. Details of a user's manual driving operation to a steering wheel, a brake pedal, an accelerator pedal, or the like may be acquired by the manager ECU 70 and then the manager ECU 70 may use the details in the coordination process, or may be acquired by the actuator ECU and then the actuator ECU may individually perform coordination for a user's manual driving operation and an instruction from the manager ECU 70.

The powertrain ECU 20 is an ECU that executes control to generate driving torque or to generate braking torque caused by engine brake by controlling the rotation speed of the engine 22 and the stepped transmission 21 capable of changing a speed ratio by using multiple gear stages.

The brake ECU 30 is an ECU that executes control to cause the brake device 31 to generate braking force.

The EPSECU 40 is an ECU that executes control to cause the EPS system 41 to steer.

The communication unit 80 is capable of transmitting or receiving various pieces of information by wirelessly communicating with external servers, other vehicles, and the like.

The gear stage choosing apparatus 10 is an ECU including a storage unit 11, a determination unit 12, an evaluation unit 13, and a choosing unit 14. The storage unit 11 stores a shift map containing the relationship between vehicle speed and the gear stage of the stepped transmission 21. The determination unit 12 determines the pattern in which a current gear stage is changed to a gear stage associated with an estimated vehicle speed after a lapse of a first period of time by consulting the shift map. The evaluation unit 13 evaluates fuel efficiency in some gear stages of multiple gear stages of the stepped transmission 21. Some gear stages include the determined gear stage and one or more gear stages higher or lower in less than or equal to a specific number of gear steps than the determined gear stage. The choosing unit 14 chooses a target gear stage from among the some gear stages based on the fuel efficiency.

The above-described ECUs each are typically a computer including memory and a processor. The processor of each ECU implements a function by, for example, reading out a program stored in non-transitory memory and running the program. These ECUs are connected to one another by communication lines and are capable of cooperatively operating by communicating with one another as needed.

Process

Figure 2:
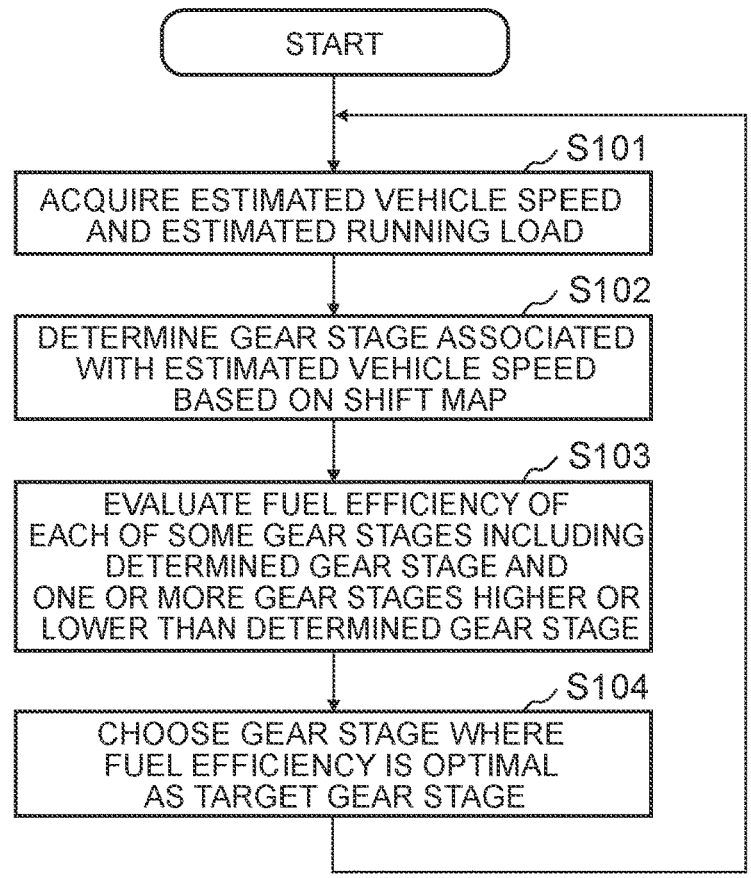
FIG. 2 is a flowchart of a gear stage choosing process according to the first embodiment.

Hereinafter, the details of a process according to the present embodiment will be described. FIG. 2 is a flowchart of a gear stage choosing process that is executed by the gear stage choosing apparatus 10. This process is, for example, started when a user turns on the power (turns on the ignition) of the vehicle to start a trip and executed until the user turns off the power to stop the trip.

Step S101

The determination unit 12 acquires an estimated vehicle speed and an estimated running load. An estimated vehicle speed is information indicating a vehicle speed after a lapse of the first period of time from current time. An estimated running load is information indicating a factor that fluctuates the running resistance of the vehicle after a lapse of the first period of time from current time and is information determined based on, for example, the gradient of a running road, the type of a road surface (such as a pavement road and a gravel road) or the condition of a road surface (such as a wet state and a snow cover state) indicating the slipperiness of the running load, a pay load (the weight of occupants and baggage), and the like.

The first period of time is, for example, a predetermined period of time and is, for example, a period of time of about several seconds to 10 seconds. The self-driving ECU 60 or the driving support ECU 50 of the vehicle is capable of deriving an estimated vehicle speed and an estimated running load by executing a unique process to execute each of the functions during operation. When the self-driving ECU 60 or the driving support ECU 50 derives an estimated vehicle speed, the determination unit 12 acquires the estimated vehicle speed. Alternatively, the determination unit 12 itself may derive an estimated vehicle speed by predicting the motion of the vehicle. The self-driving ECU 60, the driving support ECU 50, or the determination unit 12 is capable of deriving each of an estimated vehicle speed and an estimated running load based on, for example, information acquired from a pay load sensor, a camera, an obstacle sensor, or the like of the vehicle or information of surrounding running roads and traffic flow acquired from a preceding vehicle or an external server via the communication unit 80.

Step S102

The determination unit 12 determines a gear stage associated with the estimated vehicle speed based on a shift map. The shift map is information that defines in advance a relationship between gear stage and vehicle speed. A shift map is defined for each vehicle model such that, for example, fuel efficiency is optimal at a running load estimated as a standard running load. A shift map may be not only information that associates gear stage with vehicle speed but also, for example, information that associates gear stage with a combination of vehicle speed and the throttle opening degree of the engine 22. In this case, in step S101, the determination unit 12 acquires an estimated throttle opening degree after a lapse of the first period of time together with an estimated vehicle speed and determines a gear stage associated with the estimated vehicle speed and the estimated throttle opening degree based on the shift map.

Step S103

The evaluation unit 13 evaluates fuel efficiency in each of the determined gear stage and one or more gear stages higher or lower in less than or equal to a specific number of gear steps than the determined gear stage. The evaluation unit 13 uses some gear stages of the multiple gear stages of the stepped transmission 21 for evaluation. Some gear stages include the gear stage determined in step S102. For example, one or more gear stages higher or lower in less than or equal to a number of n gear steps than the determined gear stage are used for evaluation. Here, the specific number of gear steps n is, for example, a predetermined value and may be one or two. When the determined gear stage is the lowest gear stage or the highest gear stage, the determined gear stage and only one or more gear stages higher than the determined gear stage or only one or more gear stages lower than the determined gear stage are used for evaluation.

An evaluation of fuel efficiency is performed by, for example, evaluating a distance of travel per unit amount of fuel or a fuel consumption per unit distance of travel in accordance with the efficiency characteristics of the engine 22 based on a running resistance caused by an estimated running load, an estimated vehicle speed, and the rotation speed of the engine 22, determined from a gear stage, loss characteristics of the stepped transmission 21 and other drive-train, and the like. The evaluation unit 13 evaluates fuel efficiency on each of the intended gear stages. A method of evaluating fuel efficiency is not limited to this method, and another method may be used.

Step S104

The choosing unit 14 chooses a gear stage where fuel efficiency is optimal as a target gear stage. A state where fuel efficiency is optimal is, for example, a state where a distance of travel per unit amount of fuel is maximum or a fuel consumption per unit distance of travel is minimum.

When there are two or more gear stages where fuel efficiency is optimal, the choosing unit 14 chooses the one different in a minimum number of gear steps from a current gear stage as a target gear stage. Thus, the number of times of a gearshift operation is reduced. It is less likely that a gear stage where fuel efficiency is optimal is present on each of higher and lower sides of a current gear stage and those gear stages are higher and lower in the same number of gear steps than the current gear stage. In this case, any one of the higher gear stage and the lower gear stage may be chosen as a target gear stage. A chosen gear stage may be a current gear stage. In other words, in the present embodiment, changing gear stages also includes keeping the same gear stage.

The choosing unit 14 provides information indicating the determined gear stage to, for example, the powertrain ECU 20 and causes the powertrain ECU 20 to execute control to actually shift into the determined gear stage. After that, the process returns to step S101.

It is desirable that a process loop of step S101, step S102, step S103, and step S104 be, for example, executed at intervals of one second or longer in consideration of a time required to change gear stages. When a process of choosing a gear stage based on an estimated vehicle speed and an estimated running load a few seconds ahead (first period of time) is repeated at cycles shorter than the intervals, a gear stage where fuel efficiency is optimal is chosen with high accuracy at each point in time. An appropriate value may be selected as the first period of time by, for example, performing a simulation.

In step S102, the range (n) of gear stages that are used for evaluation is determined as a range that includes a gear stage where fuel efficiency is optimal even under the influence of a running load. An appropriate value may be selected as the range by, for example, performing a simulation.

In step S101, an estimated vehicle speed is a vehicle speed that is estimated when a user does not operate either the accelerator pedal or the brake pedal. When a user is performing such an operation, the functions of self-driving control and driving support control are cancelled as a rule, and it may be difficult to predict a user's operation, so the accuracy of an estimated vehicle speed is limited. For this reason, in this case, for example, in step S101, an estimated vehicle speed is not acquired, step S102 and step S103 are skipped, and, in step S104, the determination unit 12 determines a gear stage associated with a current vehicle speed based on the shift map, and the choosing unit 14 chooses the determined gear stage as a target gear stage.

The configuration of the devices installed in the vehicle and the configuration and process of the gear stage choosing apparatus 10, described above, are one example, and addition, replacement, modification, and omission are possible as needed. The functions of the devices may be implemented by integrating the devices into a single device or separating any one of the devices into multiple devices as needed.

For example, the gear stage choosing apparatus 10 may be provided as an independent ECU or may be provided so as to be distributed among the powertrain ECU 20, the manager ECU 70, and the like. For example, the number of the driving support ECUs 50 is not limited, and the self-driving ECU 60 may be omitted.

Advantageous Effects

The gear stage choosing apparatus 10 according to the present embodiment determines a gear stage based on an estimated vehicle speed and a shift map and chooses a gear stage where fuel efficiency resulting from consideration of an estimated running load is optimal from among a reasonable range of gears stages including the determined gear stage and one or more gear stages higher or lower than the determined gear stage as a target gear stage. With this configuration, in comparison with the case where a gear stage determined based on a shift map is directly chosen as a target gear stage, fuel efficiency is improved.

In addition, the gear stage choosing apparatus 10 uses some gear stages of multiple gear stages of the stepped transmission 21 to evaluate fuel efficiency. Therefore, in comparison with the case where all the gear stages are used to evaluate fuel efficiency, the amount of calculation is reduced, and the gear stage choosing apparatus 10 is suitably applied to real-time control. Particularly, as the number of gear stages of the stepped transmission 21, for example, increases and is greater than or equal to four, higher advantageous effects are obtained.

When the gear stage choosing apparatus 10 acquires an estimated vehicle speed and an estimated running load from one or more devices capable of deriving an estimated vehicle speed and an estimated running load, as in the case of the driving support ECU 50 or the self-driving ECU 60, the amount of calculation is further reduced.

Second Embodiment

Hereinafter, a second embodiment of the disclosure will be described. In the present embodiment, a simulation apparatus 100 generates a gradient pattern of a running road for a vehicle and a vehicle speed pattern for, for example, testing and evaluating the gear stage choosing apparatus 10 according to the first embodiment.

Configuration

Figure 3:
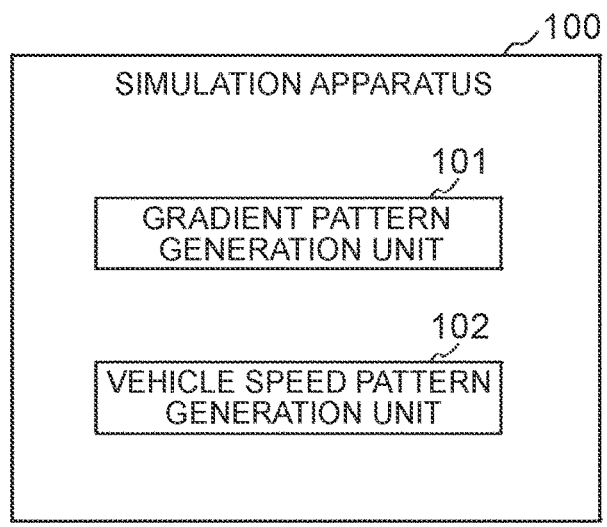
FIG. 3 is a functional block diagram of a simulation apparatus according to a second embodiment of the disclosure.

FIG. 3 shows the functional blocks of the simulation apparatus 100 according to the present embodiment. The simulation apparatus 100 includes a gradient pattern generation unit 101 and a vehicle speed pattern generation unit 102. The gradient pattern generation unit 101 generates a gradient pattern of a running road for simulation. The vehicle speed pattern generation unit 102 generates a vehicle speed pattern for simulation.

Process

First, a gradient pattern generation process of the gradient pattern generation unit 101 will be described. The gradient pattern generation unit 101 sequentially derives gradients $S_i$ of sections $P_i$ (i=1, 2, 3, . . . , N) into which a running road is divided by a first distance. Here, the first distance and the number N of sections are determined as needed in advance according to details of tests and evaluations, and the like. Here, a gradient is typically the ratio of a height to a horizontal distance of a running road; however, a different definition may be used. A gradient may be, for example, an angle that a running road forms with a horizontal plane. A gradient is not limited.

The gradient pattern generation unit 101 initially sets the gradient $S_1$ of the first section $P_1$ including the starting point of the running road to a first gradient s (s>0) at a probability of ½ or to −s at a probability of ½. Here, the first gradient s is determined as needed in advance according to details of tests and evaluations, and the like.

The gradient pattern generation unit 101 subsequently sets the gradient $S_2$ of the second section $P_2$ next to the first section $P_1$ to $S_1$+s at a probability of ½ or to $S_1$−s at a probability of ½ by using the gradient $S_1$ of the first section $P_1$ and the first gradient s.

Similarly thereafter, the gradient pattern generation unit 101 sets the gradient $S_{i+1}$ of the (i+1)th section $P_{i+1}$ to $S_i$+s at a probability of ½ or to $S_i$−s at a probability of ½ by using the gradient $S_i$ of the ith section $P_i$ and the first gradient s, thus sequentially deriving the gradient $S_1$ of the first section $P_1$ to the gradient $S_N$ of the Nth section $P_N$ including the endpoint.

The gradient pattern generation unit 101 outputs an array of the gradient $S_1$ to the gradient $S_N$ derived by increasing or reducing gradients at an equal probability in this way as a gradient pattern for simulation.

Figure 4:
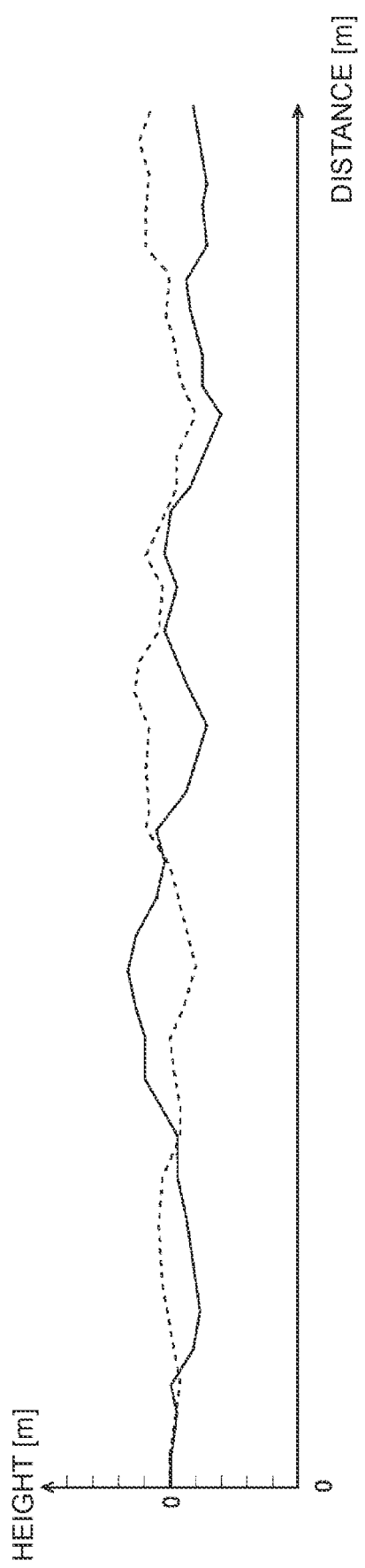
FIG. 4 is a view showing an example of a gradient pattern according to the second embodiment of the disclosure.

An example of the gradient pattern is shown in FIG. 4. FIG. 4 is a graph of a gradient pattern, in which the abscissa axis represents a distance from a starting point and the ordinate axis represents a height from the starting point. An example of the gradient pattern is represented by the continuous line, and another example is represented by the dashed line. A gradient pattern generated by this method is a random pattern; however, the distribution of gradients in any section and the distribution of average gradients of all the sections both are normal distributions with an average of zero. Therefore, with this method, multiple gradient patterns having statistically the same property are generated.

Next, a vehicle speed pattern generation process of the vehicle speed pattern generation unit 102 will be described. The vehicle speed pattern generation unit 102 uses the following model.

This model will be described with reference to FIG. 5. In this model, a lead vehicle 111 runs in accordance with a first vehicle speed pattern. The first vehicle speed pattern is a predetermined vehicle speed temporal variation pattern. The first vehicle speed pattern is not limited. The first vehicle speed pattern may be a vehicle speed pattern that is used in the fuel consumption rate test (JC08 mode) in Japan or a vehicle speed pattern that is used in Worldwide harmonized light vehicles test procedure (WLTP) proposed as an international standard.

In this model, a rearmost vehicle 113 runs behind the lead vehicle 111. An intermediate vehicle 112 runs between the lead vehicle 111 and the rearmost vehicle 113. The number of the intermediate vehicles 112 increases by one at a probability of ½ or reduces by one at a probability of ½ every first period. The first period is determined as needed in advance according to details of tests and evaluations, and the like. When the current number of intermediate vehicles becomes zero, the number of the intermediate vehicles, for example, increases by one at a probability of ½ or remains zero at a probability of ½ in a subsequent period.

Figure 5:
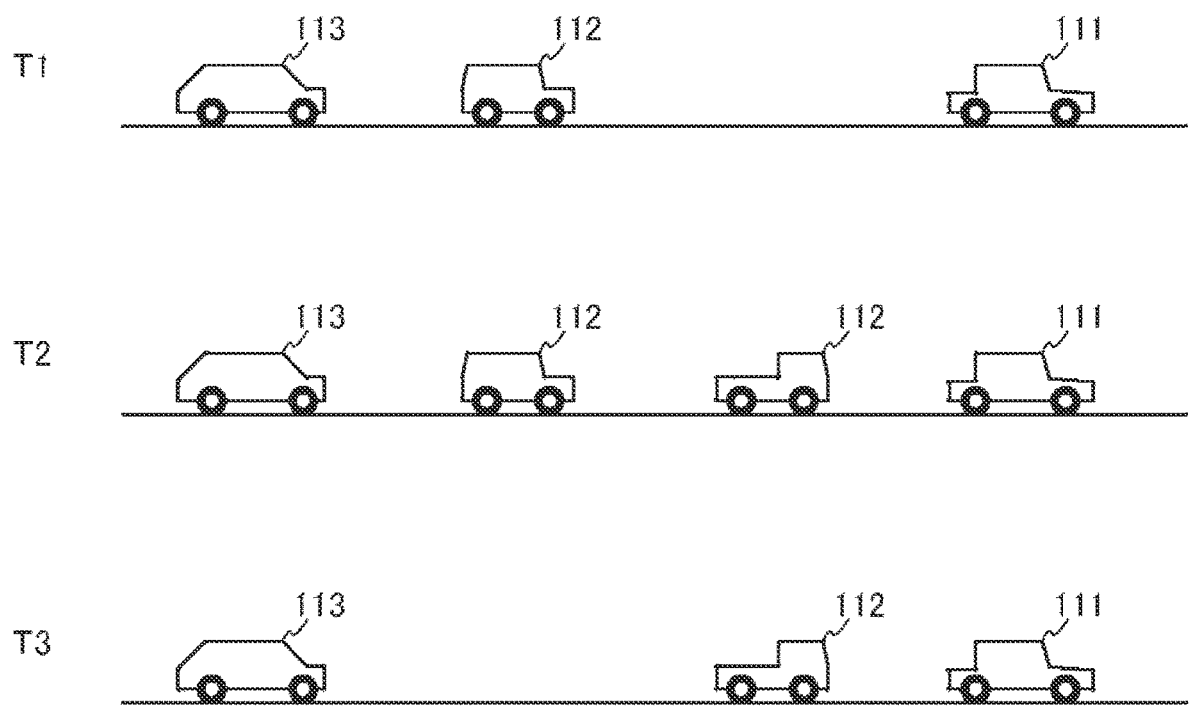
FIG. 5 is a view showing a model that is used to generate a speed pattern according to the second embodiment of the disclosure.

In the example shown in FIG. 5, in a period T1, one intermediate vehicle 112 is running as an example. In the subsequent period T2, the number of the intermediate vehicles 112 increases by one into two as an example. In the further subsequent period T3, the number of the intermediate vehicles 112 reduces by one into one as an example. In this model, it is assumed that, for example, as shown in FIG. 5, the number of the intermediate vehicles 112 increases in a manner such that a new one cuts in just behind the lead vehicle 111 and the number of the intermediate vehicles 112 reduces in a manner such that one just ahead of the rearmost vehicle 113 disappears. It is not necessary to increase or reduce the intermediate vehicles 112 in accordance with this rule. The number of the intermediate vehicles 112 may increase or reduce at any location.

In this model, the intermediate vehicle 112 and the rearmost vehicle 113 each run based on a first preceding vehicle following algorithm. The first preceding vehicle following algorithm is an algorithm that controls the vehicle speed of a host vehicle such that an appropriate inter-vehicle distance from a vehicle running ahead of the host vehicle is maintained. Specific details of the algorithm are not limited. For example, the same algorithm as the one implemented in the driving support ECU 50 having a preceding vehicle following function may be employed. The intermediate vehicle 112 and the rearmost vehicle 113 each may run based on a different preceding vehicle following algorithm vehicle by vehicle.

The vehicle speed pattern generation unit 102 derives the vehicle speed of the rearmost vehicle 113 in such a model and outputs the temporal variation pattern of the vehicle speed as a vehicle speed pattern for simulation. With this method, based on the patterns defined as standard vehicle speed patterns in JC08 mode, WLTP, and the like, multiple vehicle speed patterns incorporating realistic randomness, that is, fluctuations in the number of intermediate vehicles, are generated.

The simulation apparatus 100 may include any one of the gradient pattern generation unit 101 and the vehicle speed pattern generation unit 102.

Advantageous Effects

The simulation apparatus 100 according to the present embodiment is capable of suitably generating multiple variations of gradient patterns having statistically the same property and is capable of suitably generating multiple variations of vehicle speed patterns incorporating realistic randomness into patterns defined as standard vehicle speed patterns. For example, by applying a gradient pattern to an estimated running load and applying a vehicle speed pattern to an estimated vehicle speed, these patterns may be used to test and evaluate the gear stage choosing apparatus 10 according to the first embodiment, with the result that promotion of development and high performance of the gear stage choosing apparatus 10 are achieved. Other than the gear stage choosing apparatus 10, these patterns may be used to test and evaluate various driving support ECU 50, self-driving ECU 60, and the like installed in the vehicle, with the result that promotion of development and high performance are achieved.

The embodiments of the disclosure are described above; however, the disclosure may be modified as needed. The disclosure may be regarded as not only a gear stage choosing apparatus but also a gear stage choosing method and a gear stage choosing program that are executed by the gear stage choosing apparatus including a processor and memory, a non-transitory computer-readable storage medium storing the gear stage choosing program, a vehicle including the gear stage choosing apparatus, and the like. The disclosure may be regarded as not only a simulation apparatus but also a simulation method and a simulation program that are executed by the simulation apparatus including a processor and memory, and a non-transitory computer-readable storage medium storing the simulation program.

The disclosure is usable in a gear stage choosing apparatus installed in a vehicle, or the like, and a simulation apparatus therefor.

What is claimed is:

1. A gear stage choosing apparatus that chooses a gear stage of a stepped transmission included in a vehicle, the gear stage choosing apparatus comprising:
   one or more processors programmed to function as:
      a storage unit configured to store a shift map containing a relationship between vehicle speed and gear stage; and
      a determination unit configured to determine a gear stage associated with an estimated vehicle speed after a lapse of a first period of time from current time based on the shift map;
      an evaluation unit configured to evaluate fuel efficiency in each of some gear stages of multiple gear stages, the each of some gear stages including the determined gear stage and one or more gear stages higher or lower in less than or equal to a specific number of gear steps than the determined gear stage; and
      a choosing unit configured to choose a gear stage selected from among the each of some gear stages based on the fuel efficiency as a gear stage to which a current gear stage is changed.

2. The gear stage choosing apparatus according to claim 1, wherein the choosing unit is configured to choose a gear stage where the evaluated fuel efficiency is best among the each of some gear stages as a gear stage to which a current gear stage is changed.

3. The gear stage choosing apparatus according to claim 1, wherein, when an entire or some motion of the vehicle is controlled by a driving controller included in the vehicle, the determination unit is configured to acquire the estimated vehicle speed from the driving controller.

4. The gear stage choosing apparatus according to claim 1, wherein the estimated vehicle speed is a vehicle speed that is estimated when a user does not operate any of an accelerator pedal or a brake pedal.

5. The gear stage choosing apparatus according to claim 1, wherein the evaluation unit is configured to evaluate the fuel efficiency by using an estimated running load of the vehicle.

6. The gear stage choosing apparatus according to claim 5, wherein the estimated vehicle speed and the estimated running load each are derived based on information acquired from at least one of a sensor included in the vehicle, a preceding vehicle, and an external server.

7. A gear stage choosing method that is executed by a gear stage choosing apparatus that chooses a gear stage of a stepped transmission included in a vehicle, the gear stage choosing method comprising:
   determining a gear stage associated with an estimated vehicle speed after a lapse of a first period of time from current time based on a prestored shift map containing a relationship between vehicle speed and gear stage;
   evaluating fuel efficiency in each of some gear stages of multiple gear stages, the each of some gear stages including the determined gear stage and one or more gear stages higher or lower in less than or equal to a specific number of gear steps than the determined gear stage; and
   choosing a gear stage selected from among the each of some gear stages based on the fuel efficiency as a gear stage to which a current gear stage is changed.

* * * * *